United States Patent [19]

Sawada et al.

[11] Patent Number: 4,912,408

[45] Date of Patent: Mar. 27, 1990

[54] DISTANCE MEASURING SYSTEM USING SUPERCONDUCTING QUANTUM INTERFERENCE DEVICE

[75] Inventors: Takeshi Sawada, Yamato; Ryo Kuroda, Atsugi; Noriyuki Nose, Machida; Yukichi Niwa, Atsugi, all of Japan

[73] Assignee: Canon Kabushiki Kaisha, Tokyo, Japan

[21] Appl. No.: 199,706

[22] Filed: May 27, 1988

[30] Foreign Application Priority Data

Jun. 3, 1987 [JP] Japan .................. 62-138224

[51] Int. Cl.$^4$ .................. G01B 7/14; G01R 33/035
[52] U.S. Cl. .................. 324/207.13; 324/248; 505/843; 505/872
[58] Field of Search .............. 324/207, 208, 235, 248; 505/842, 843, 872

[56] References Cited

U.S. PATENT DOCUMENTS

| | | | |
|---|---|---|---|
| 3,286,161 | 11/1966 | Jones et al. ............ | 324/207 X |
| 3,777,255 | 12/1973 | Young et al. .......... | 324/207 |
| 4,315,214 | 2/1982 | Kataoka ................. | 324/208 |
| 4,489,274 | 12/1924 | Berlincourt ........... | 324/248 |
| 4,491,795 | 1/1985 | Gelinas .................. | 324/208 |

FOREIGN PATENT DOCUMENTS

| | | |
|---|---|---|
| 3234733 | 5/1983 | Fed. Rep. of Germany ...... 324/207 |
| 3201873 | 8/1983 | Fed. Rep. of Germany . |
| 3425612 | 1/1986 | Fed. Rep. of Germany . |
| 3515237 | 10/1986 | Fed. Rep. of Germany . |
| 3529815 | 12/1984 | Fed. Rep. of Germany ...... 324/248 |
| 0074612 | 5/1982 | Japan .................. 324/207 |
| 0158502 | 9/1983 | Japan .................. 324/208 |

OTHER PUBLICATIONS

Phys. Bull. 38, Michael Dickens, "Sensationally Sensitive SQUIDS", 1987, pp. 296–299.

Primary Examiner—Gerard R. Strecker
Attorney, Agent, or Firm—Fitzpatrick, Cella, Harper & Scinto

[57] ABSTRACT

Disclosed is a distance measuring system suitably usable in a semiconductor microcircuit manufacturing lithographic apparatus such as an aligner or a stepper, for measuring the position or the distance of movement of a movable object such as a mask stage or a wafer stage. The system includes a magnetic field producing portion such as a magnet for producing a predetermined magnetic field, a superconducting quantum interference device coupled to the mask stage or the wafer stage. Further, there are provided a magnetic flux detecting portion for outputting signals corresponding to changes in the magnetic flux, in the magnetic field, passing through the superconducting quantum interference device and a signal processing unit for processing the output signals of the magnetic flux detecting portion to detect the position or the distance of movement of the mask stage or the wafer stage. Also, a shielding member is provided to shield at least the magnetic field producing portion and the magnetic flux detecting portion against an external magnetic field, by use of a superconductor. The distance measuring system of the present invention assures accurate measurement with a high resolution, for a wide movable range of the movable member such as a range not less than 100 mm.

6 Claims, 4 Drawing Sheets

DISTANCE MEASURING SYSTEM USING SUPERCONDUCTING QUANTUM INTERFERENCE DEVICE

FIELD OF THE INVENTION AND RELATED ART

This invention relates to a distance measuring system suitably usable in a semiconductor microcircuit device manufacturing photolithographic apparatus such as a mask aligner or a stepper, for detecting the position or the amount of movement of a mask stage or a wafer stage.

For use in semiconductor microcircuit device manufacturing aligners or steppers, many varieties of distance measuring systems have been proposed and developed. As for the distance measuring systems having a resolution in a range of 1 micron to 1 nanometer, there are a method utilizing the interference of a laser beam, a precise differential transformer method, a method utilizing the change in inductance, a method utilizing the change in electro-static capacitance, etc. Of these methods, the method using the interference of a laser beam ensures a resolution of an order of 1 nm as well as a sufficient measurable length not less than 100 mm. Thus, it is prevalently used for the distance measurement in the aligners or steppers.

On the other hand, the method utilizing the change in inductance or electrostatic capacitance is not prevalent because of its narrow measurable range. The precise differential transformer method is used in many applications because the required structure is simple. Since, however, the maximum detection sensitivity (resolution) thereof is of an order of 30 nm, usually this method is adopted for the measurement wherein the required resolution is of an order of 100 nm. Further, the measurable range as attainable by this method is 10-20 mm, which is insufficient for the measurement to be made in an aligner wherein a length not less than 100 mm should be measured.

Also, in the case of the method using the interference of a laser beam, there are problems of stability of a laser beam source and thermal deformation of a portion irradiated with the laser beam, which problems should be solved to attain stable distance measurement at the precision of 1 nm.

SUMMARY OF THE INVENTION

It is an object of the present invention to provide a novel and unique distance measuring system which is capable of attaining a wide measurable range and a high measurement resolution.

Briefly, the present invention provides a distance measuring system which uses a superconducting quantum interference device (hereinafter simply "SQUID") and which attains the distance measurement at the precision of nanometer.

More specifically, in accordance with one aspect of the present invention, to achieve the above object, there is provided a distance measuring system which comprises: a magnetic field producing means; a magnetic flux detecting means having a SQUID; a signal processing means and a superconducting shield means. Within an inside space shielded from an outside magnetic field by the superconducting shield means, and in a magnetic field produced by the magnetic field producing means, the magnetic flux detecting means detects a magnetic flux density. On the basis of an output signal from the magnetic flux detecting means, the signal processing means operates to determine the position of an object coupled to the SQUID or the distance of movement of that object.

In the described structure, the magnetic flux quantity passing through a SQUID placed in the magnetic field and retained in a superconducting state is detected by the magnetic flux detecting means as an electric voltage signal that varies, due to the action of the SQUID, periodically with a unit period corresponding to the amount of change, in the magnetic flux quantity, equal to an intrinsic fluxoid quantum. The magnetic flux detecting means outputs such an electric voltage signal. When the SQUID moves, the signal processing means counts, on the basis of the electric voltage signal outputted from the magnetic flux detecting means during the movement, the changes in the magnetic flux quantity having been changed during the movement while taking the fluxoid quantum as a unit. At this time, the magnetic flux quantity passing through the SQUID depends on the position of the SQUID provided that the magnetic field is maintained steady. Accordingly, from the relationship between the magnetic flux quantity and the position of the SQUID, having been detected preparatorily, and from the number counted as described above, it is possible to detect the distance of movement, in the unit (resolution) of the fluxoid quantum.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
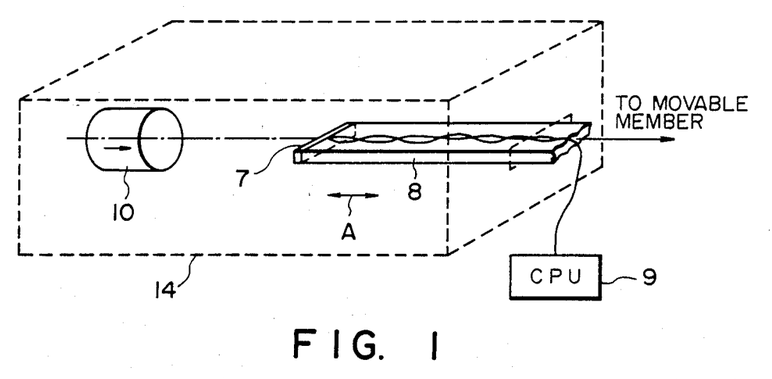
FIG. 1 is a schematic view showing the structure of a distance measuring system according to a first embodiment of the present invention.
Figure 2:
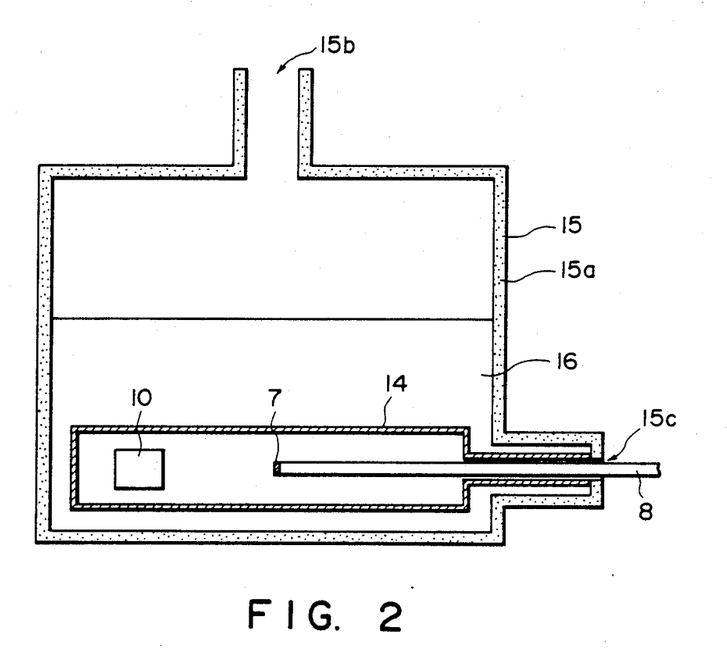
FIG. 2 is a schematic view of a cooling means used in the distance measuring system of the first embodiment.

FIG. 1 is a schematic view showing the structure of a distance measuring system according to one embodiment of the present invention. Denoted in FIG. 1 at 7 is a dc-SQUID (a superconducting quantum interference device of the type wherein a DC bias is used) which is arranged to detect a magnetic flux and to produce a signal corresponding to the magnetic flux density. The dc-SQUID 7 is fixed to a movable portion 8. Lead wires from the dc-SQUID 7 are connected to a processing unit 9 wherein the signals from the SQUID 7 are processed by a computer. Disposed opposed to the dc-SQUID 7 is a sanarium cobalt (SmCo) magnet 10 which is magnetized in the direction of arrow A along which the SQUID 7 is movable. The magnet 10 is disposed so that its center line coincides with the center line of the SQUID 7 in the direction of the movement thereof. The dc-SQUID 7, the movable portion 8 and the magnet 10 are accommodated in a shield casing 14 having an inside coating made of a superconducting material. The casing 14 itself is made of a metal such as stainless steel and formed into a box-like shape. As best seen in FIG. 2, the casing 14 is accommodated in a jar 15 so as to allow that the casing 14 as a whole is cooled by a suitable refrigeration medium 16 such as, for example, liquid nitrogen or liquid helium.

The jar 15 has a dual-wall structure made of a metal such as stainless steel. The inside space 15a between the walls is maintained at vacuum. At an upper portion of the jar 15, there is formed an opening 15b which is provided to allow the supply of the refrigeration medium 16 and the exhaustion of a vaporized gas. Further, in the side surface of the jar 15, there is formed an opening 15c which is provided to allow the movable portion 8 to protrude outwardly of the jar 15. In order to prevent leakage of the refrigeration medium 16 contained in the jar 15, the opening end portion of the casing 14 intimately contacts to this opening portion 15c, as illustrated. In an occasion where the movable portion 8 moves vertically, not horizontally in the illustrated example, the opening 15b may be omitted and the opening end portion of the casing 14 may be formed in a spaced relation so that the opening 15c can function also as the opening 15b.

Figure 3:
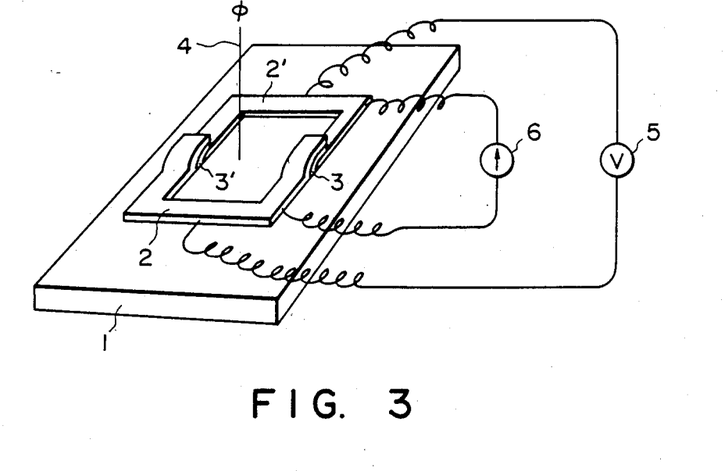
FIG. 3 is a schematic view showing the structure of a dc-SQUID used in the distance measuring system of the FIG. 1 embodiment.

FIG. 3 is a schematic view in which the structure of the dc-SQUID 7 is illustrated in an enlarged scale. As is known in the art, a SQUID (superconducting quantum interference device) is operable as a magnetic flux detecting device which functions to detect a magnetic flux by utilizing Josephson's effect that can be observed in the superconducting state. As shown in FIG. 3, a SQUID may be provided by forming superconducting thin films 2 and 2' on a base plate 1 by means of a thin film forming technique, the superconducting thin films 2 and 2' being formed like a closed circuit or a ring with the interposition of insulating layers 3 and 3'.

In the present embodiment, the thin films 2 and 2' are formed as a superconducting material member of a dc-SQUID, having two weak links: the thin films 2 and 2' being formed first by forming a thin film member of a 3-micron thickness by use of ceramics such as, for example, Y-Ba-Cu-O or Ba-La-Cu-O and, then, by forming, by photography, the thin film member into a window-like shape having a stripe width of 50 microns and a magnetic flux detecting portion area of 0.5 mm². As for the insulating layer portions 3 and 3', SiO₂ material of a 0.005-micron thickness is used.

When, in operation, a magnetic flux 4 passes, as shown in FIG. 3, through the SQUID which is formed in the described manner and which is in the superconducting state, a voltage detecting means 5 electrically connected to the thin films 2 and 2' can detect the change in the electric voltage corresponding to the quantity of the magnetic flux 4 passing the SQUID. As described, a dc-SQUID such as at 7 is featurized in that two weak links (which correspond to the insulating layers 3 and 3') are provided and that a voltage detecting means used is of a type that detects a DC electric current.

Figure 4:
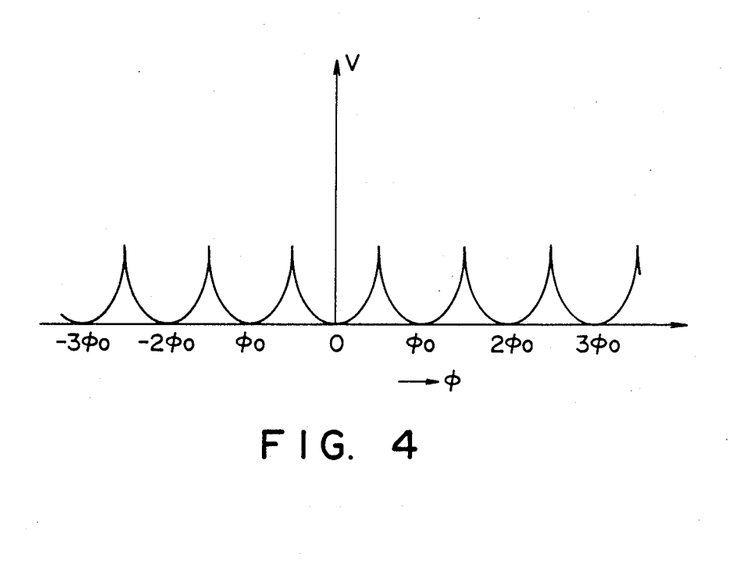
FIG. 4 is a graph showing voltage versus magnetic flux characteristics of the dc-SQUID.

The relationship between the magnetic flux 4 and the electric voltage of a SQUID is, as illustrated in FIG. 4, depicted by repeated changes like waves, repeatedly changing with the quantity of the magnetic flux (the axis of abscissa). For creation of such an electric voltage, a bias current close to the critical current for the dc-SQUID 7 is necessary and this is supplied by a bias current producing means 6. In FIG. 4, the voltage V changes periodically with intervals of $\phi_0$, and the value $\phi_0$ is an instrinsic magnetic flux quantity which can be represented by $2.07 \times 10^{-15}$ Wb and which is called "fluxoid quantum".

From the foregoing, it is seen that when, in the FIG. 1 embodiment, the dc-SQUID 7 moves relatively to the magnet 10 which is a magnetic flux producing source, the electric voltage characteristics such as shown in FIG. 4 are obtained so that, by measuring or counting the number of peaks in the electric voltage, the distance of movement of the SQUID 7 can be measured.

More specifically, if, as an example, the permanent magnet 10 is of a type wherein a magnetic flux density of an order of 0.5 tesla is formed on the surface thereof and a magnetix flux density of 0.005 tesla is detected at a point spaced by 100 mm from the magnet 10, then there will occur a magnetic flux density change of $1 \times 10^{-4}$ tesla per 1 mm. It will be understood that if, in such a case, the magnetic flux detecting portion of the dc-SQUID has an area of 1 mm², fluxoid quanta $\phi_0$ (peaks) of a number $10^{-5}$ are counted for the movement of the SQUID 7 through 1 mm. Namely, a distance of 10 nm is detectable per one fluxoid quantum $\phi_0$.

In the meantime, if future improvements in the performance of a voltage detecting portion 5 enables detection of the phase of each fluxoid quantum $\phi_0$, i.e. the state of change in the voltage between $n\phi_0$ and $(n+1)\phi_0$ in FIG. 4 (wherein n is an integral number), then it might be easily possible to attain a resolution of $10^{-3} \phi_0$, namely the distance measuring precision of 0.1 nm (1A). Accordingly, by suitably using in combination the counting of fluxoid quantia $\phi_0$ and the phase detection (with the resolution of $10^{-3}$), it might be attainable to measure a distance with a very high resolution of an order of 0.1 nm, over a wide measurement range efficiently in a short time. However, in such a case, it will be necessary to predetect the relationship between the distance and the magnetic flux quantity.

In the present embodiment described hereinbefore, a permanent magnet 10 is used as a magnetic flux producing source. However, in consideration of a possibility of fluctuation or a change, with ages, of the magnetization of a permanent magnet, a permanent current retained by a superconductor may be utilized as a magnetic flux producing source, without using a permanent magnet. In such a case, it is possible to preparatorily and accurately determine, by calculation, the magnetic flux densities at different locations. Therefore, the amount of movement can be measured in terms of an absolute value.

In the measurement using a SQUID, an external noise is a problem to be considered. In the present embodiment, the measuring device as a whole is shielded by a superconductor (shield casing 14). Consequently, owing to Meissner effect, no stray magnetic field is mixed from the outside into the measuring device and, as a result of which, high-precision measurement is made attainable.

Recently, materials which show the superconductivity at a temperature not lower than the liquid nitrogen temperature (77° K.) have been found one after another. By using such a material or materials, it is possible to assure that the SQUID, the superconducting member and the shield member, described above, are brought into a superconducting state at a temperature not lower than 77° K.

In the present embodiment, the direction of magnetization of the magnet 10 is coincident with the moving direction of the SQUID 7. However, in consideration of the possibility of preparatory detection of the relationship between the magnetic flux density and the position, this is not always necessary. It should be noted however that the probability of occurrence of a measurement error, in an occasion where a SQUID used is deviated vertically and/or horizontally, is lowest in the case of the present embodiment.

Figure 5:
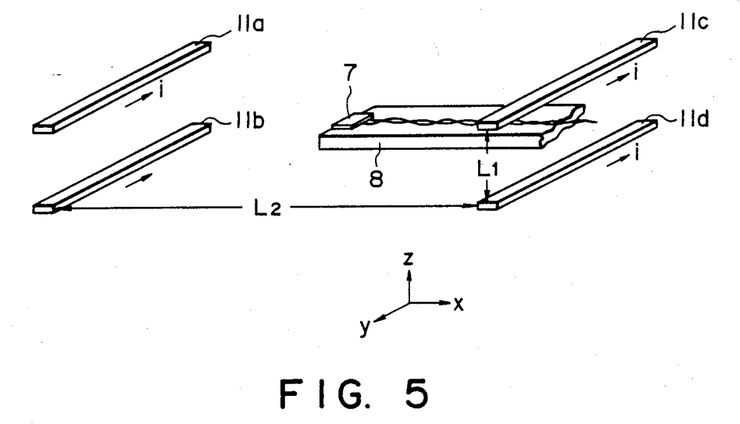
FIG. 5 is a schematic view showing the structure of a distance measuring system according to a second embodiment of the present invention.

FIG. 5 is a schematic view showing the structure of a distance measuring system according to a second embodiment of the present invention.

Figure 7:
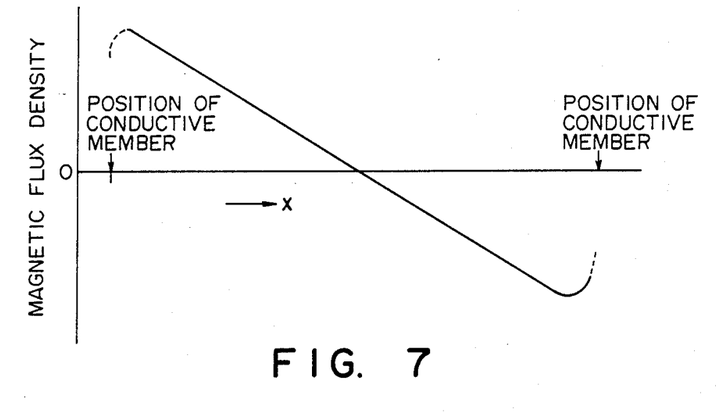
FIG. 7 is a graph showing a magnetic flux density distribution in the distance measuring system of the second embodiment.

A dc-SQUID 7 shown in FIG. 5 has the same structure as of that used in the first embodiment, so that the distance of movement can be measured in accordance with the same principle. In the distance measuring system of the FIG. 5 embodiment, four superconducting members 11a, 11b, 11c and 11d are used and disposed symmetrically with respect to the vertical and horizontal directions so as to provide a flux gradient such as shown in FIG. 7. More specifically, the superconducting members 11a and 11b (11c and 11d) are disposed symmetrically with respect to a plane which contains the SQUID 7 and which is parallel to an X-Y plane. Also, the paired superconducting members 11a and 11b and the paired superconducting members 11c and 11d are disposed symmetrically with respect to a plane which is parallel to a Y-Z plane. Additionally, each of the superconducting members 11a-11d are disposed substantially in parallel to a Y-axis. Further, these superconducting members are disposed so that the interval (L2) between the superconducting members in the direction of the movement of the SQUID 7 (i.e. the direction of an X-axis) is sufficiently large as compared with the interval (L1) between the superconducting members in the vertical direction (i.e. the direction of a Z-axis). The dc-SQUID 7 is coupled to a movable member, not shown, and is moved along a center line which lies in a central reference plane which is a plane containing the SQUID 7 and is extending in parallel to the X-Y plane. The described structure as a whole is accommodated in a superconducting shield casing 14 as in the case of the FIG. 1 embodiment. Further, the four superconducting members 11a-11d are mutually connected, at the outside of the shield casing, by use of a superconductor so that electric currents can flow through these superconducting members in the same direction.

With the described structure, a magnetic field is produced by permanent currents flowing in the superconducting members 11a-11d and, for this reason, the produced magnetic field is quite stable. Also, since each superconducting member extends in parallel to the Y-axis, the produced magnetic field does not provide a magnetic flux change with the shift of the SQUID in the Y direction. Further, with regard to the shift of the SQUID in the vertical direction (Z-axis direction), the provision of two vertically arrayed superconducting members (11a and 11b; 11c and 11d) spaced at the interval L1 which is sufficiently small as compared with the interval L2, effectively prevents a large amount of magnetic flux change. Accordingly, the described structure shows good stability.

Figure 6:
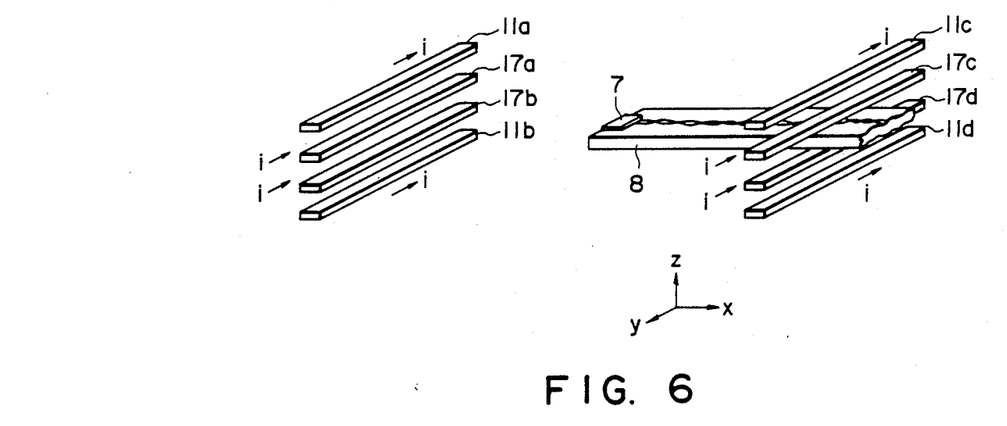
FIG. 6 is a schematic view showing a modified form of the second embodiment.

When, in the described structure, the dc-SQUID 7 moves in the X direction, the magnetic flux density changes substantially rectilinearly such as shown in FIG. 7. Therefore, the measurement or control of the distance of movement is quite easy. Also, in order to further improve the rectilinearity of the magnetic flux change, auxiliary superconducting members such as at 17a-17d shown in FIG. 6 may be used and disposed in parallel to the superconducting members 11a-11d and in a manner that the same positional conditions, as described with reference to the pairs of the superconducting members 11a-11c, are satisfied in the pairs of the superconducting members 17a-17d. While in the FIG. 6 example the superconducting members 17a ad 17b (17c and 17d) are provided between the superconducting members 11a and 11b (11c and 11d), the former may be provided so as to sandwich the latter therebetween. In summary, these auxiliary superconducting members may be disposed at desired locations while taking into account the linearity of the change in the magnetic flux density.

Additionally, for the control of a permanent current in a superconducting member, an additional SQUID may be provided and disposed at a location other than the above-described shield casing 14. By providing such an additional SQUID in a fixed positional relation with the superconducting members 11a-11d and by using the additional SQUID as an electric current monitor, it is possible to easily control the electric current at the precision of $10^{-3}$ $\phi_0$.

In accordance with the present embodiment, it is possible to preparatorily detect, by numerical calculation, the magnetic flux densities at different locations and this can be made at a very high precision. Therefore, the amount of movement can be measured in terms of an absolute value.

Figure 8:
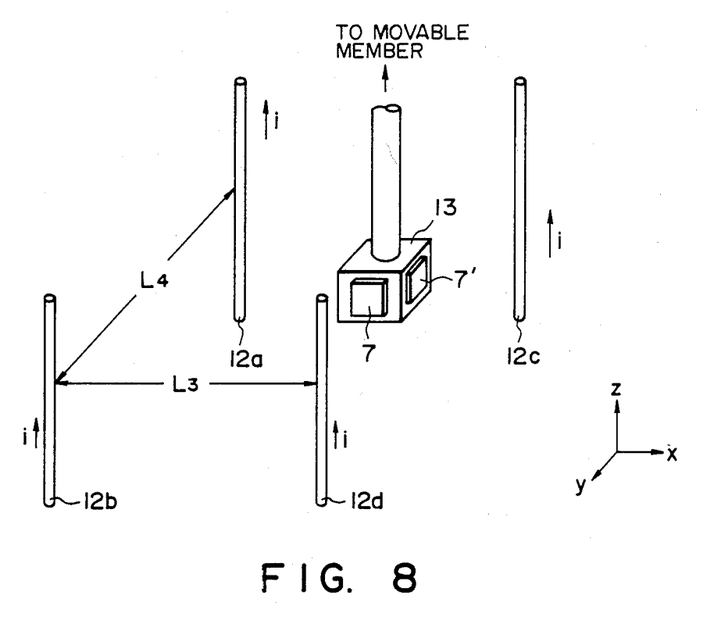
FIG. 8 is a schematic view showing the structure of a distance measuring system according to a third embodiment of the present invention.

FIG. 8 is a schematic view showing the structure of a distance measuring system according to a third embodiment of the present invention. As shown in FIG. 8, the measuring system of the present embodiment comprises a magnetic field producing means which includes four bar-like superconducting members 12a, 12b, 12c and 12d. These superconducting members 12a-12d extend substantially in parallel to a Z-axis and are disposed as if they are positioned at four corners of a square lying in an X-Y plane. Namely, the interval (L3) between the members 12b and 12d (12a and 12c) in the X direction is substantially equal to the interval (L4) between the members 12a and 12b (12c and 12d) in the Y direction. Further, the distance measuring system is arranged so that electric currents flow in the superconducting members 12a-12d in the same direction, as in the foregoing embodiment. Additionally, as in the foregoing embodiment, the illustrated structure as a whole is isolated by a superconducting shield.

Disposed approximately at the center of an inside space enclosed by the four superconducting members 12a-12d is a table 13 having an X-Z surface and a Y-Z surface upon which a SQUID 7 and another SQUID 7' are provided, respectively. Accordingly, the SQUID 7 and the SQUID 7' are operable to detect changes in the orthogonal components, in the X and Y directions, of the magnetic flux as formed by the superconducting members 12a-12d. The table 13 is coupled to a movable member, not shown.

With the described structure, it is possible to measure two-dimensional movement of the unshown movable member in the X and Y directions, by processing signals from the SQUID 7 and the SQUID 7'. Accordingly, the present embodiment provides a high-precision two-dimensional distance measuring system.

While four superconducting members are used in the present embodiment, two or more superconducting members, of a desired number, may be used in accordance with the dimension of the movable range of the movable member. For example, three superconducting members may be disposed at three corners of a triangle as viewed on the X-Y plane. Even in such case, the magnetic flux density can be calculated and, therefore, two-dimensional absolute-value measurement is attainable.

The present invention is not limited to the disclosed forms of the foregoing embodiments. Many modifications are possible within the scope of the present invention. For example, a dc-SQUID used in the foregoing embodiments to detect a magnetic flux may be replaced by an ac(rf)-SQUID which has an advantageous feature in respect to the elimination of noise. The distance measurement with substantially the same characteristics is attainable with such a device.

In accordance with the present invention, as has hitherto been described, a magnetic field is created within a superconducting shield and, in this shield, a superconducting quantum interference device is provided to detect a magnetic flux, by which the position or the distance of movement of such a device is detected or measured. This provides various advantageous effects, examples of which are as follows:

(1) A wide measurement range is attainable.

(2) The structure of a superconducting quantum interference device used in the distance measuring system as well as the structure of the distance measuring system are simple.

(3) Where four or more superconducting members are used as a magnetic field producing means, the distance can be measured in terms of an absolute value.

(4) Where two superconducting quantum interference devices are used as a magnetic flux detecting means and when they are disposed so that their magnetic flux detecting surfaces extend perpendicularly to each other, it is possible to effect two-dimensional measurement in a magnetic field as produced by a magnetic field producing means that comprises two or more superconducting members.

While the invention has been described with reference to the structures disclosed herein, it is not confined to the details set forth and this application is intended to cover such modifications or changes as may come within the purposes of the improvements or the scope of the following claims.

What is claimed is:

1. A distance measuring system, comprising:
   magnetic field producing means for producing a predetermined magnetic field;
   magnetic flux detecting means having a superconducting quantum interference device coupled to a movable member, said magnetic flux detecting means being operable to produce signals corresponding to changes in the magnetic flux, of the magnetic field, that passes through said superconducting quantum interference device;
   signal processing means for counting the signals from said magnetic flux detecting means, to detect at least one of the position and the distance of movement of the movable member with respect to a predetermined reference point; and
   superconductor shield means enclosing said magnetic field producing means and said magnetic flux detecting means for shielding, with the Meissner effect of a superconductor, at least said magnetic field producing means and said magnetic flux detecting means against an external magnetic field.

2. A system according to claim 1, further comprising cooling means effective to maintain said magnetic flux detecting means and said shield means in a superconducting state.

3. A system according to claim 1, wherein said magnetic field producing means comprises a permanent magnet.

4. A system according to claim 1, wherein said magnetic field producing means comprises four superconducting members which are effective to produce a magnetic field by use of electric currents flowing therethrough and wherein said superconducting members are disposed perpendicularly with respect to the moving direction of said superconducting quantum interference device and symmetrically with respect to a vertical direction and also that they extend in parallel to each other.

5. A system according to claim 4, wherein said magnetic field producing means includes an auxiliary superconducting member.

6. A system according to claim 1, wherein said magnetic flux detecting means includes two-superconducting quantum interference devices disposed perpendicularly to each other and wherein said magnetic field producing means includes at least two superconducting members for producing a magnetic field by use of electric currents flowing therethrough.

* * * * *

UNITED STATES PATENT AND TRADEMARK OFFICE
CERTIFICATE OF CORRECTION

PATENT NO. : 4,912,408

DATED : March 27, 1990

INVENTOR(S) : TAKESHI SAWADA, ET AL.

Page 1 of 2

It is certified that error appears in the above-identified patent and that said Letters Patent is hereby corrected as shown below:

ON THE TITLE PAGE,
IN [56] REFERENCES CITED

U.S. PATENT DOCUMENTS, "4,489,274  12/1924  Berlincourt" should read --4,489,274  12/1984  Berlincourt--.

FOREIGN PATENT DOCUMENTS, "3529815  12/1984" should read --3529815  2/1987--.

COLUMN 1

Line 22, "electro-static" should read --electrostatic--.

COLUMN 4

Line 12, "instrinsic" should read --intrinsic--.
    Line 25, "magnetix" should read --magnetic--.
    Line 35, "enables" should read --enable--.
    Line 42, "quantia" should read --quanta--.

COLUMN 5

Line 49, "is extending" should read --extends--.

COLUMN 6

Line 17, "ad" should read --and--.
    Line 65, "directions." should read --directions,--.

UNITED STATES PATENT AND TRADEMARK OFFICE
CERTIFICATE OF CORRECTION

PATENT NO. : 4,912,408

DATED : March 27, 1990

INVENTOR(S) : TAKESHI SAWADA, ET AL.

Page 2 of 2

It is certified that error appears in the above-identified patent and that said Letters Patent is hereby corrected as shown below:

COLUMN 8

Line 47, "two-superconduct-" should read --two superconduct- --.

Signed and Sealed this

Fifteenth Day of October, 1991

Attest:

HARRY F. MANBECK, JR.

Attesting Officer

Commissioner of Patents and Trademarks